United States Patent [19]
Chuang et al.

[11] Patent Number: 5,617,935
[45] Date of Patent: Apr. 8, 1997

[54] FRICTION PAD FOR A DISK BRAKE

[76] Inventors: William Chuang; King Y. K. Chuang, both of 1230 Miramonte Ave., Los Altos, Calif. 94022

[21] Appl. No.: 697,868

[22] Filed: Aug. 30, 1996

[51] Int. Cl.⁶ .............................. F16D 65/00; F16D 65/40
[52] U.S. Cl. ................ 188/73.1; 188/250 B; 188/250 G; 188/251 R; 192/107 R
[58] Field of Search .................................. 188/73.1, 73.2, 188/218 L, 25, 72.2, 71.1, 250 B, 250 G, 264 G, 217, 135, 138, 158, 161, 162, 39, 80, 37, 366, 367, 218 A, 251 R, 251 M; 192/107 R

[56] References Cited

U.S. PATENT DOCUMENTS

| | | | |
|---|---|---|---|
| 2,835,367 | 5/1958 | Steck | 192/107 R |
| 3,034,365 | 5/1962 | Stieber | 188/72.2 |
| 3,156,324 | 11/1964 | Colbert | 188/25 |
| 3,693,765 | 9/1972 | Hikida et al. | 188/73.37 |
| 3,743,060 | 7/1973 | Hendrickson | 188/72.2 |
| 4,055,235 | 10/1977 | Tanaka et al. | 188/72.2 |
| 4,055,236 | 10/1977 | Dowell | 192/107 R |
| 4,278,153 | 7/1981 | Venkatu | 188/73.2 |
| 4,315,563 | 2/1982 | Hayashi et al. | 188/73.1 |
| 4,533,032 | 8/1985 | Lamarche | 192/107 R |
| 4,823,916 | 4/1989 | Shyu | 188/25 |
| 5,178,235 | 1/1993 | Montalvo, III et al. | 192/107 R |
| 5,322,146 | 6/1994 | Holl et al. | 188/72.2 |

FOREIGN PATENT DOCUMENTS

| | | | |
|---|---|---|---|
| 848630 | 1/1939 | France | 188/80 |
| 0025979 | 2/1977 | Japan | 188/72.2 |
| 1244599 | 9/1971 | United Kingdom | 188/71.1 |

*Primary Examiner*—Douglas C. Butler

[57] ABSTRACT

A friction pad for a disc brake comprising a stationary pad which is fixed on a backing plate, and a rotatable pad which is rotatably attached to the backing plate, wherein the rotatable pad is rotatable along an axis which is perpendicular to the backing plate.

3 Claims, 1 Drawing Sheet

FRICTION PAD FOR A DISK BRAKE

This invention relates to a friction pad for a disc brake and more particularly to such friction pad that has at least a portion thereof which can rotate along an axis which is perpendicular to the friction pad.

BACKGROUND OF THE INVENTION

Conventional friction pads are mostly stationary (i.e., fixedly mounted on a backing plate). After a period of time of use, an uneven surface is formed on a disc at areas contacting the friction pads when brake is being applied. This uneven surface on the disc damages the disc and hinders proper operation of the brake, especially a wave-shaped surface may be formed on the disc and when a brake is being applied, a "dead lock" may happen and the brake pedal has to be released in order to relieve the disk from the dead lock.

SUMMARY OF THE INVENTION

Accordingly, it is an object of this invention to provide a friction pad for a disc brake which will not form an uneven surface on the disc and which a dead lock will not incur. This is achieved by providing at least a portion of the friction pad which is rotatable so that when a brake is being applied, the rotatable portion of the friction pad rotates while applying braking pressure to the disc and therefore no uneven surface will be formed on the disc.

DETAILED DESCRIPTION OF THE INVENTION

Figure 1:
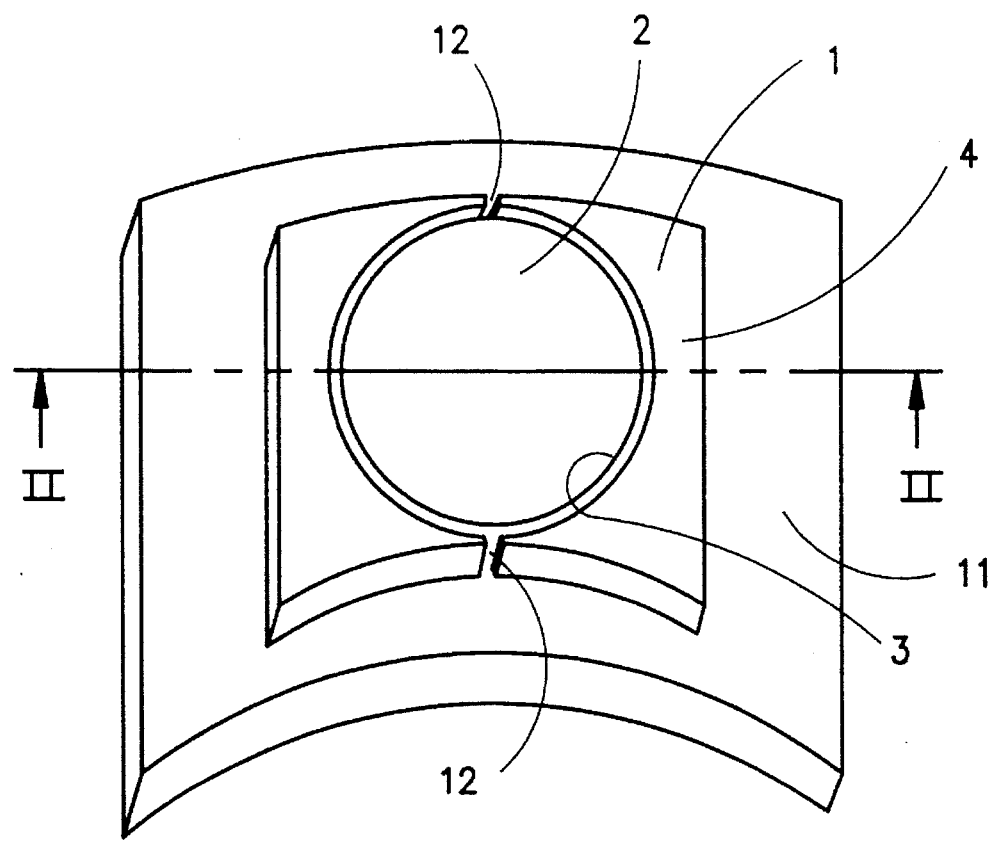
FIG. 1 is a schematic view showing a friction pad of the present invention with a backing plate.
Figure 2:
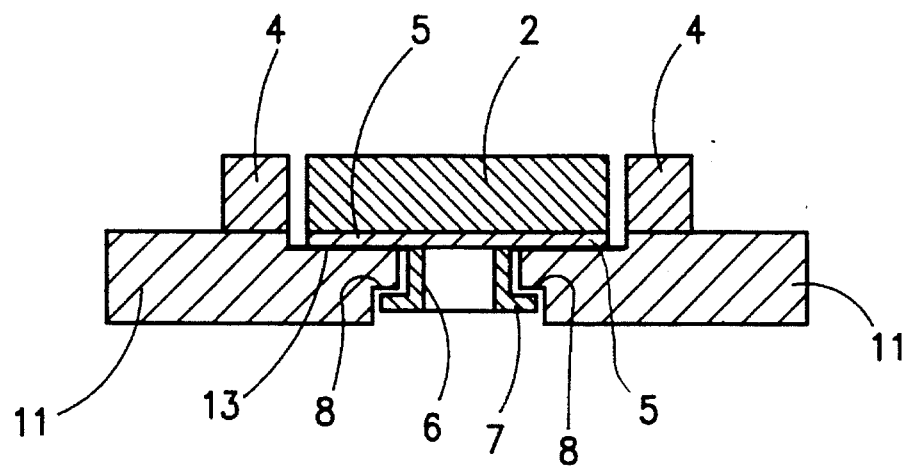
FIG. 2 is a cross-sectional view taken along line II—II in FIG. 1.

Please refer to FIGS. 1 and 2. The friction pad of the present invention is generally designated with a numeral 1. The friction pad 1 is comprised of a Stationary pad 4 and a rotatable pad 2 located in a cut-off portion 3 of the stationary pad 4.

A lower plate 5 made of steel or other metal is attached with the rotatable pad 2. A tubular portion 6 is fastened to or formed integrally with the lower central portion of the lower plate 5.

The stationary pad 4 is fastened to a backing plate 11 which has a central cut-off portion. A stepped portion 8 is formed on the central cut-off portion of the backing plate 11. The tubular portion 6 of the lower plate 5 is inserted into the central cut-off portion of the backing plate 11 and the lower end of the tubular portion 6 can be expanded (i.e., bent outwardly employing riveting operation or the like) to form an enlarged end portion 7. The enlarged end portion 7 cooperates with the stepped portion 8 of the backing plate 11 so as to prevent the rotatable pad 2 and the lower plate 5 from accidentally falling off. The enlarged end portion 7 can be oblique to or perpendicular to the tubular portion 6. The stepped portion 8 can be oblique if the end portion 7 is oblique. External threads (not shown in the drawings) can be formed on the lower portion of the tubular portion 6 so that a nut (not shown in the drawings) can be attached thereto, as a substitute for the enlarged end portion 7.

The rotatable pad 2 and the Stationary pad 4 can be made of same or different braking material.

The lower plate 5 can be made of steel or other material, e.g., copper or brass, which is the same as or different from the material of the backing plate 11. The lower face of the lower plate 5 can be made uneven (e.g., formed with concentric grooves, radial grooves or the like) and some lubricating material 13 (preferably graphite or other lubricant which can endure high temperature) can be applied to the gap between the lower plate 5 and the backing plate 11, to reduce the friction. The tubular portion 6 can be formed integrally with the lower plate 5, if necessary.

There is only one rotatable pad 2 shown in the drawings. The number of the rotatable pad 2 can be more than one.

In another embodiment, the friction pad 1 can be comprised only of the rotatable pad 2, the tubular portion 6, the lower plate 5, and the enlarged end portion 7. That is to say, the stationary pad 4 can be eliminated, if necessary.

A bearing assembly (not shown in the drawings) can be provided between the lower plate 5 and the contacting upper surface of the backing plate 11, if necessary, to ensure a smooth operation.

As shown in FIG. 1, the stationary pad 4 has at least one opening 12 so that powders resulting from the friction due to braking can be discharged therefrom.

As shown in FIG. 2, the lower plate 5 is fitted in a recess formed on the upper face of the backing plate 11 so that the recess can serve as a guide for the rotatable pad 2. The cut-off portion 3 of the stationary pad 4 can also serve as a guide for the rotatable pad 2.

We claim:

1. A friction pad for a disc brake comprising a stationary pad which is fixed on a backing plate, and a rotatable pad which is rotatably attached to the backing plate, wherein the rotatable pad is rotatable along an axis which is perpendicular to the backing plate, wherein at least a cut-off portion is formed on the stationary pad, the rotatable pad is rotatably accommodated in the cut-off portion of the stationary pad, a lower plate is formed with the rotatable pad, the lower plate has a tubular portion which is accommodated in a cut-off portion formed in the backing plate, a lubricating means is provided between the lower plate and a face on the backing plate contacting the rotatable pad, and an enlarged portion is formed at the lower end of the tubular portion so as to prevent the rotatable pad and the lower plate from accidentally falling off.

2. The friction pad as in claims 1, wherein a plurality of grooves are formed on the lower face of the lower plate so as to receive lubricating material.

3. The friction pad as in claim 1, wherein the stationary pad is provided with at least one opening for discharging powders resulting from the friction due to braking.

* * * * *